United States Patent
Dastidar et al.

(10) Patent No.: US 12,235,950 B2
(45) Date of Patent: Feb. 25, 2025

(54) HIERARCHICAL HARDWARE-SOFTWARE PARTITIONING AND CONFIGURATION

(71) Applicant: XILINX, INC., San Jose, CA (US)

(72) Inventors: Jaideep Dastidar, San Jose, CA (US); James Murray, Los Gatos, CA (US); Stefano Stabellini, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 319 days.

(21) Appl. No.: 17/578,292

(22) Filed: Jan. 18, 2022

(65) Prior Publication Data

US 2023/0229757 A1 Jul. 20, 2023

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/45579* (2013.01); *G06F 2009/45587* (2013.01)

(58) Field of Classification Search
CPC ................. G06F 21/53; G06F 9/45558; G06F 2009/45579; G06F 2009/45587; G06F 2009/455

See application file for complete search history.

(56) References Cited

U.S. PATENT DOCUMENTS

| | | | |
|---|---|---|---|
| 9,959,214 B1* | 5/2018 | Habusha | G06F 12/1027 |
| 2016/0182398 A1* | 6/2016 | Davis | G06F 13/4031 710/313 |
| 2016/0232335 A1* | 8/2016 | Violleau | G06F 21/629 |
| 2016/0357700 A1* | 12/2016 | Klinglesmith | G06F 3/068 |
| 2018/0204024 A1* | 7/2018 | Lillibridge | G06F 3/0659 |
| 2020/0019701 A1* | 1/2020 | Sun | G06F 21/556 |
| 2020/0298870 A1* | 9/2020 | Davidovich | B60W 50/0205 |
| 2022/0245255 A1* | 8/2022 | Hinnershitz | G06F 12/1441 |

FOREIGN PATENT DOCUMENTS

WO 2007027739 A1 3/2007

OTHER PUBLICATIONS

Bartock et al., Hardware-Enabled Security: Enabling a Layered Approach to Platform Security for Cloud and Edge Computing Use Cases, https://nvlpubs.nist.gov/nistpubs/ir/2021/NIST.IR.8320-draft2.pdf (Year: 2021).*
Arm, Exception model, version 1.0, https://developer.arm.com/-/media/Arm%20Developer%20Community/PDF/Learn%20the%20Architecture/Exception%20model.pdf?revision=a62f2bf2-b08a-4a4f-8cbe-38c67ddf4434 (Year: 2019).*

(Continued)

*Primary Examiner* — Kaveh Abrishamkar
*Assistant Examiner* — Howard H. Louie
(74) *Attorney, Agent, or Firm* — Patterson + Sheridan, LLP

(57) ABSTRACT

Embodiments herein describe partitioning hardware and software in a system on a chip (SoC) into a hierarchy. In one embodiment, the hierarchy includes three levels of hardware-software configurations, enabling security and/or safety isolation across those three levels. The levels can cover the processor subsystem with compute, memory, acceleration, and peripheral resources shared or divided across those three levels.

20 Claims, 5 Drawing Sheets

(56) References Cited

OTHER PUBLICATIONS

Vanderleest et al., "MPSoC hypervisor: The Safe & Secure Future of Avionics", 2015 IEEE/AIAA 34th Digital Avionics Systems Conference (DASC), IEEE, Sep. 13, 2015 (Sep. 13, 2015), pp. 1-12, XP032802044, DOI: 10.1109/DASC.2015.7311448 [retrieved on Oct. 28, 2015] (Year: 2015).*
Souppaya, Murugiah, "hardware-Enabled Security: Enabling a Layered Approach to Platform Security for Cloud and Edge Computing Use Cases NIST IR 8320", NIST, National Institute of Standards and Technology, Sep. 29, 2020.
"Memory Management", arm, Version 1.0, Jun. 20, 2019.
Vanderleest, Steven H., "MPSoC Hypervisor: The safe and secure future of avionics", 2015 IEEE/AIAA 34th Digital Avionics Systems Conference (DASC), IEEE, Sep. 13, 2015.
Pinto, Sandro, "Demystifying Arm TrustZone: A Comprehensive Study", ACM Computing Surveys, ACm, New York, NY, US, vol. 51, No. 6, Jan. 28, 2019.
Pierre, Lucas, et al., "VOSYSmonitor, a TrustZone-based Hypervisor for ISO 26262 Mixed-critical System", 2018 3rd Conference of Open Innovations Association (FRUCT), Nov. 13, 2018.

* cited by examiner

HIERARCHICAL HARDWARE-SOFTWARE PARTITIONING AND CONFIGURATION

TECHNICAL FIELD

Examples of the present disclosure generally relate to partitioning hardware and software resources into different levels of a hierarchy.

BACKGROUND

Typical embedded processor subsystems give the hypervisor or operating system (OS) executing on the subsystems permission to configure, assign, or reconfigure or reassign, any hardware resource in the processor subsystem. These resources, managed by a hypervisor for example, include compute resources such as central processing unit (CPU) cores, memory resources such as on-chip memory (OCM) or double date rate (DDR) memory, acceleration engines, programmable logic, and peripherals such as PCIe, Ethernet, Universal Serial Bus (USB), Universal Asynchronous Receiver Transmitter (UART), and Inter-Integrated Circuit (I2C).

For safety critical deployments, it may be desirable for certain resources to remain inaccessible to even a hypervisor. There can be several reasons such as (i) the ability to log and/or diagnose a failure of the hypervisor domain—where the resources to log or diagnose a failure would have depended on resources that are functionally compromised if they were part of the hypervisor domain and (ii) a system integrator (e.g., the manufacturer of an automobile, boat, airplane, etc.) uses a hypervisor developed by a third party in the processing system and wants to have private system integrator resources inaccessible to that hypervisor.

For security critical deployments, it may also be desirable for certain resources to remain inaccessible to even a hypervisor. For example, the system integrator may use their own (trusted) hypervisor but still want to assure customers that the device is capable of storing customer secrets such as customer encryption keys, in a location inaccessible to that system integrator via their own hypervisor.

For safety or security critical deployments, permitting a hypervisor, which may be developed by a third party, to access the entire processor subsystem can result in failure. As a best case, the hypervisor may be buggy and result in an unsafe condition. As a worst case, the hypervisor may have a security flaw that permits a nefarious user to introduce an unsafe condition. Thus, for safety or security reasons, an operator may wish to block trusted and non-trusted/third-party hypervisors or OSs from accessing functions or resources in the embedded processor that can result in an unsafe condition or a security flaw.

SUMMARY

Techniques for partitioning hardware and software resources into different levels of a hierarchy are described. One example is a system on a chip (SoC) that includes a first processing element configured to execute a trusted operating system (OS) that is assigned to a first level in a hierarchy, a second processing element configured to execute a first hypervisor or OS that is assigned to a second level in the hierarchy, a third processing element configured to execute a second hypervisor or OS that is assigned to a third level in the hierarchy and memory where a first portion of the memory is assigned to the first level, a second portion of the memory is assigned to the second level, and a third portion of the memory is assigned to the third level. Moreover, the trusted OS is authorized to manage the first, second, and third portions of the memory, the first hypervisor or OS is authorized to manage the second and third portions of the memory but not the first portion of the memory, and the second hypervisor or OS is authorized to manage only the third portion of the memory.

One example described herein is a system on a chip (SoC) that includes a first processing element configured to execute a trusted operating system (OS) that is assigned to a first level in a hierarchy, a processor subsystem comprising a first processor core configured to execute one of a safety critical hypervisor or a TEE OS where the first processor core is assigned to a second level in the hierarchy, a second processor core configured to execute one of a non-safety critical hypervisor or second OS that is not in a TEE where the second processor core is assigned to a third level in the hierarchy. Further, the trusted OS is authorized to manage hardware resources assigned to the first, second and third levels, the safety critical hypervisor or the TEE OS is authorized to manage hardware resources assigned to the second and third levels but not the first level, and the non-safety critical hypervisor or second OS is authorized to manage hardware resources assigned to the third level but not the first and second levels.

One example described herein is a method that includes assigning Level 1 resources in a SoC during a secure boot of the SoC, assigning Level 2 resources in the SoC using a Level 1 trusted OS that was loaded during the secure boot where the Level 2 resources includes a first hypervisor or OS that is held in reset while assigning the Level 2 resources, assigning Level 3 resources in the SoC using the Level 1 trusted OS where the Level 3 resources includes a second hypervisor or OS that is held in reset while assigning the Level 3 resources. Moreover, the Level 1 trusted OS is authorized to manage the Level 1, 2, and 3 resources, the Level 2 resources are authorized to manage the Level 2 and 3 resources but not the Level 1 resources, and the Level 3 resources are authorized to manage the Level 3 resources but not the Level 1 and 2 resources.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
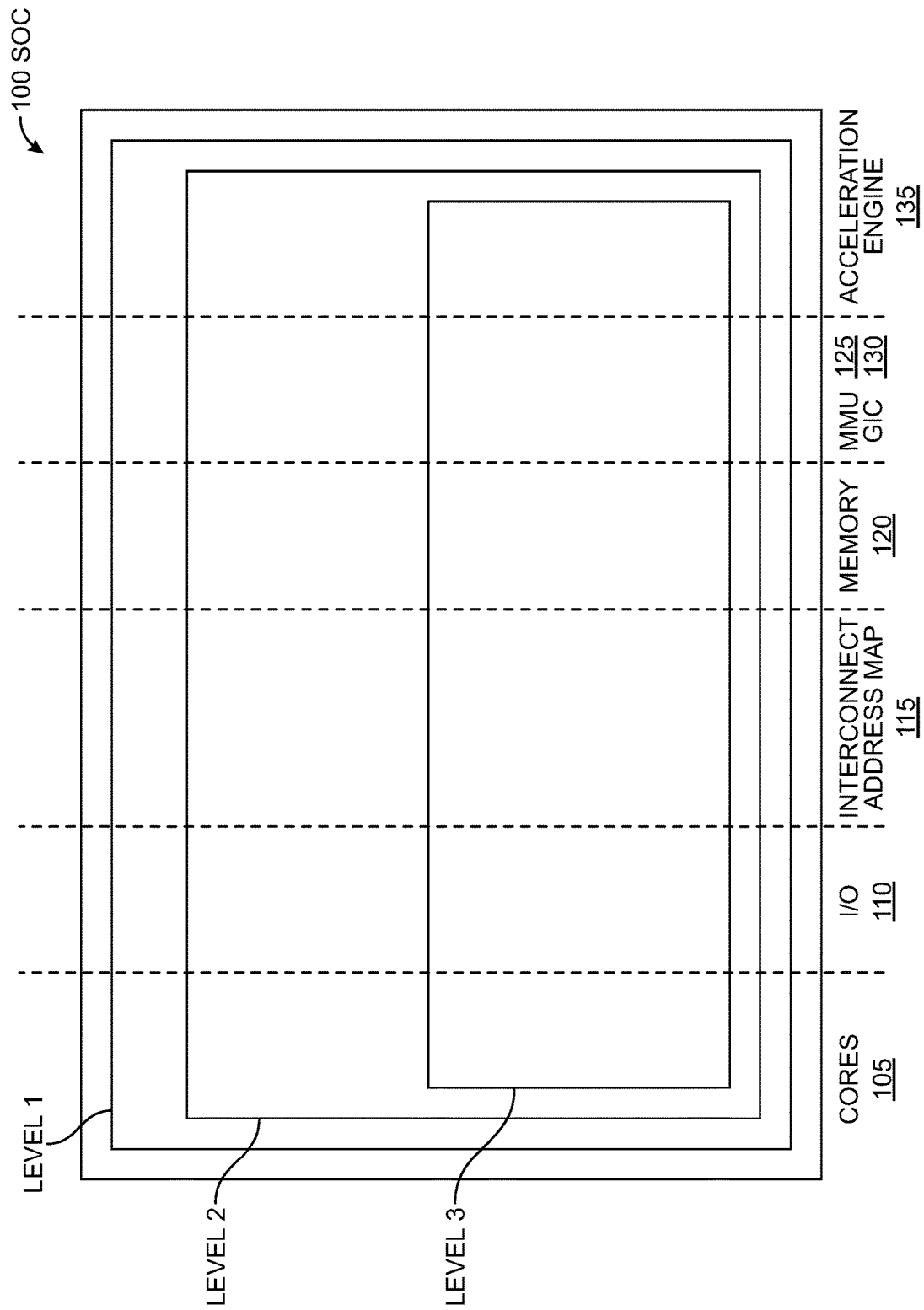
FIG. 1 is a logical view of a system on a chip that is partitioned into a hierarchy, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe partitioning hardware and software in a system on a chip (SoC) into a hierarchy. In one embodiment, the hierarchy includes three levels of hardware-software configurations, enabling security and/or safety isolation across those three levels. The levels cover the processor subsystem with compute, memory, acceleration, programmable logic, and peripheral resources shared or divided across those three levels.

In the examples below, the first level (Level 1) is the highest level (e.g., the most trusted or safest level) that is controlled by a secure boot loaded root of trust configuration when the SoC is being powered on. The first level dictates which resources can and cannot be accessed by the other two levels, even if the other levels are along the chain of trust. For example, even if the resources assigned to the second level are in the same chain of trust as the resources in the first level (e.g., the Level 1 and Level 2 resources are operated or controlled by the same entity), a nefarious actor (e.g., a disgruntled employee) cannot access the first level resources.

The second level (Level 2) can be a Hypervisor, OS, or software which can be capable of reassigning processor subsystem resources. Level 2 can control the resources in its level, along with the resources in the third level (Level 3). In addition to Level 1 preventing Level 2 and Level 3 actors from accessing resources private to Level 1, Level 1 can also firewall Level 2 resources to prevent access by Level 3 actors. The three levels of security/safety can be applied to processor subsystems for Safety Applications (Automotive, aerospace and defense (A&D), Industrial) or Security Applications (A&D, Data Center).

FIG. 1 is a logical view of a SoC 100 that is partitioned into a hierarchy, according to an example. The bottom of FIG. 1 lists various hardware elements in the SoC 100 that can be partitioned or assigned to the different levels of the hierarchy (i.e., Levels 1, 2, and 3). These hardware elements include processor cores 105, input/output (I/O) 110, an interconnect address map 115, memory 120, a memory management unit (MMU) 125, a general interrupt controller (GIC) 130, and accelerator engines 135.

In one embodiment, these hardware elements are in a processor subsystem of the SoC 100. Although not shown, the SoC 100 may also include other components such as a network on a chip (NoC), programmable logic, an array of data processing engines, and I/O interfaces which are not in the processor subsystem. These components may, or may not, be assigned to the different levels in the hierarchy. That is, in one embodiment, only the hardware and software elements in the processor subsystem of the SoC 100 are assigned to levels in the hierarchy while the hardware and software elements in the SoC 100 that are external to the processor subsystem are not In another embodiment, additional components in the SoC, as well as the processor subsystem, are partitioned into the hierarchy.

The boxes labeled Level 1, 2, and 3 illustrate different portions of the hardware resources that are assigned to different levels. For example, because the boxes extend across the vertical areas defined by the hardware elements, this means each level is assigned at least one resource from each of the hardware resources—e.g., at least one core 105, a I/O device, a portion of the interconnect address map 115, a portion of the MMU 125, etc. However, this is not a requirement. For example, the entity assigned to Level 3 may not need to access the accelerator engine 135, thus, the Level 3 box may not extend to the accelerator engine 135. This indicates that the Level 3 resources (and any entity with software assigned to the Level 3 resources) cannot access the accelerator engine 135. Thus, in some embodiments, different hardware resources in the SoC 100 may be assigned to some levels, but not others, in the hierarchy.

As shown, the Level 2 box is contained within the Level 1 box and the Level 3 box is contained within the Level 2 box. This nesting indicates the hierarchy where Level 1 resources are authorized to configure, reconfigure, and manage Level 2 and Level 3 resources and Level 2 resources are authorized to configure, reconfigure, and manage Level 3 resources. However, the reverse is not true. For example, Level 3 resources cannot access or use Level 1 or Level 2 resources, and Level 2 resources cannot access or use Level 1 resources. As discussed below, this separation between the layers can be controlled by access control circuitry in the SoC 100. For example, the access control circuitry can ensure that a Level 3 core 105 can access Level 3 memory 120 but cannot access Level 1 and Level 2 memory 120. As another example, a Level 3 accelerator engine 135 cannot access or use Level 1 and Level 2 I/O 110.

In one embodiment, Level 1 is the Hardware Manufacture Base Level. That is, the Level 1 may be assigned to be used by the manufacturer of the SoC 100. In one embodiment, Level 1 is created via the Secure Boot loaded Root of Trust Configuration of the SoC. When powering on the SoC, the secure boot can load a binary that then controls the functions of the Level 1 resources.

Level 1 is the highest privileged level and can configure, access, or reconfigure resources in the base level and any of the next two levels. For example, the management software and firmware executing on the Level 1 hardware resources, which can be loaded using the binary executed during the secure boot, can then create Levels 2 and 3. In one embodiment, Level 1 can also choose to have neither of the Level 2 or Level 3 resources, software, or hardware be able to access the resources deemed by the Hardware Manufacture Base Level as private to Level 1. In one embodiment, the Level 1 configuration and management software can be executed on processing resources, such as the processor cores 105 in the processor subsystem of the SoC 100. However, in another embodiment, the Level 1 configuration and management software can be executed in a Platform Management Controller (PMC) that is external to the processor subsystem in the SoC. The PMC can be a separate hardened processing element or programmable logic that executes the management software assigned to Level 1, which in turn configures the Level 2 and 3 resources.

In one embodiment, the Level 1 management software is approved by an auditing process. Using the A&D space as an example, a government entity may audit the management software of the hardware manufacturer to ensure it meets specific security protocols. If so, that software is then approved for Level 1. Because the Level 1 management software is loaded during a secure boot, it is ensured it is the only Level 1 management software executing on the SoC.

In one embodiment, Level 2 is an Automotive Safety Integrity Level D (ASIL-D) safety critical level, or is a security critical level, depending on whether the SoC 100 is used in the Automotive/Industrial safety space or the Data Center/A&D security space. The management software in Level 1 provides resources to be managed by Level 2. Level 2 can then provision resources private to Level 2, as well as resource shared with or private to Level 3. Level 2 resources can configure, access, or re-configure resources in Level 2 or Level 3.

Level 2 is the next privilege level, which can be managed by either a Safety Critical (ASIL-D) Hypervisor or an OS in a Trusted Execution Environment (TEE). The management software of Level 2 can configure, access, or reconfigure resources in Level 2 and Level 3. To achieve the safety or security properties of the Level 2 software execution environment, the Safety Critical ASIL-D Hypervisor or the TEE OS are pinned for execution to the Level 2 designated cores 105. In one embodiment, the ASIL-D hypervisor and the TEE OS are pinned to Level 2 lockstep cores 105 which execute the same executable so that if one core 105 goes haywire, or a voltage glitch security attack causes one core 105 to behave differently from its lockstep partner, it can be easily detected.

In one embodiment, Level 3 is the ASIL-C or ASIL-B safety level, or the non-security critical OS or application execution level. Level 3 is the next privilege level after Level 2, where software management of resources such as multiple cores 185 can be achieved by an ASIL-B or ASIL-C Hypervisor or an entrusted commercial of-the-shelf or open source Hypervisor or OS. As a result, Level 3 software is firewalled from executing on the ASIL-D Safety Critical or TEE lockstep cores 105 designated for Level 2 management software to prevent compromising the Safety Critical (ASIL-D) Hypervisor or TEE OS. Level 3 configuration and control software (e.g., a hypervisor running on Level 3 designated core) can configure, access, or re-configure resources in Level 3 only.

Figure 2:
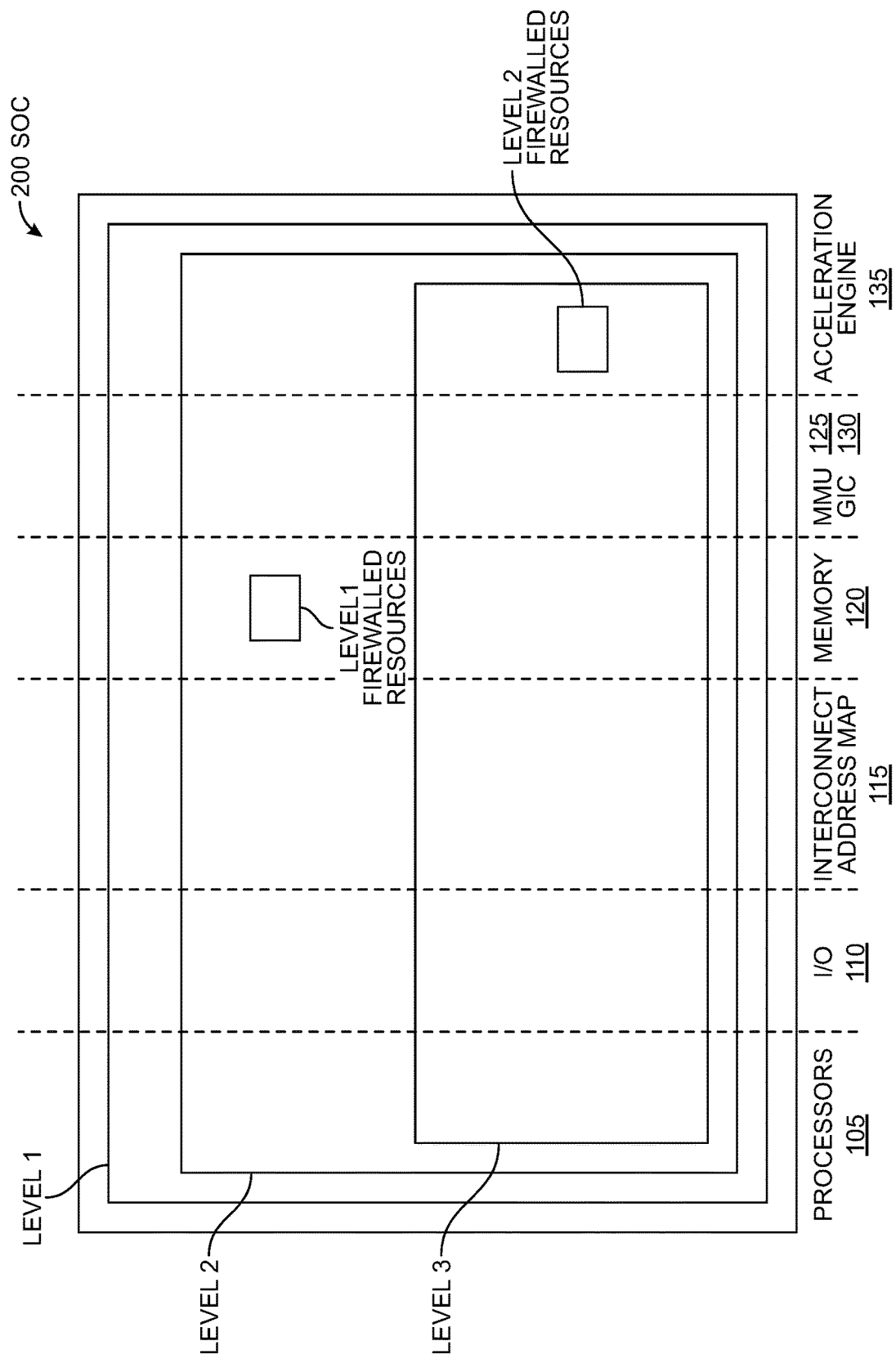
FIG. 2 is a logical view of a system on a chip that is partitioned into a hierarchy, according to examples.

FIG. 2 is a logical view of a SoC 200 that is partitioned into a hierarchy, according to examples. The bottom of FIG. 2 lists the same hardware elements in the SoC 200 that were in the SoC 100 in FIG. 1. Further, these hardware elements are partitioned or assigned to the different levels of the hierarchy (i.e., Levels 1, 2, and 3).

In addition to the hierarchy, FIG. 2 illustrates that Level 1 and Level 2 resources can be accessible by resources in Level 2 and Level 3, respectively. In this example, Level 1 firewalled resources (e.g., a portion of the memory 120) is accessible to Level 2 resources. For example, the portion of the memory that is a Level 1 firewalled resource may have data that is managed by Level 1 management software, but the user wants to make accessible to Level 2 management software (e.g., ASIL-D hypervisor or TEE OS). Level 1 management software can firewall the memory 120 so that the Level 2 management software can, e.g., read the memory but not write or alter the memory 120. For example, the firewalled memory may contain the instruction footprint or binaries. While Level 2 and/or Level 3 resources may be permitted to execute the (ASIL-D or TEE) binaries, neither is allowed to (maliciously or erroneously) modify those binaries for another Level 1, 2, or 3 entity to then execute and cause a failure or create a security hole. Thus, while the portion of memory 120 defined as the Level 1 firewalled resources is assigned to Level 1, it is nonetheless accessible (i.e., can be read by) Level 2 resources. However, this access is restricted so that only Level 1 resources can write or change the data written in the Level 1 firewalled resource.

As another example, a Level 2 firewalled resource is accessible to Level 3 resource. In this example, the Level 2 firewalled resource is an accelerator engine. For example, the SoC 200 can include a cryptographic accelerator in its processor subsystem that is assigned to Level 2. However, the Level 3 resources may also want to use this accelerator. If there are multiple cryptographic accelerators in the SoC 200, then one accelerator can be assigned to Level 2 while another accelerator is assigned to Level 3. However, there may be only one cryptographic accelerator in the SoC 200, or the Level 3 resources may use the cryptographic accelerators sparingly so assigning an entire cryptographic accelerator to Level 3 may be an inefficient use of the accelerator.

Instead, FIG. 2 illustrates allowing Level 3 resources to access an accelerator assigned to Level 2. For example, the Level 2 cryptographic accelerator may have four channels. Three of the channels may be firewalled so that they are accessible only to Level 2 resources while the fourth channel is accessible to Level 3 resources. Thus, both Level 2 and Level 3 resources can use the same cryptographic accelerator but still support the stringent safety and security safeguards afforded by using the hierarchy illustrated in FIGS. 1 and 2. To the perspective of the Level 3 resources, they think the cryptographic accelerator is dedicated to Level 3 although it is actually a Level 2 resource. Level 2 resources can make application programming interface (API) calls to its three channels while the Level 3 resources can make API calls only to its one channel, and because of the firewall, cannot access the other three channels in the cryptographic accelerator.

Thus, FIG. 2 illustrates permitting hardware resources assigned to a higher priority level in the hierarchy being accessible to a lower priority level. In one embodiment, this can only be set up by the higher priority level. That is, only Level 1 management software can establish the Level 1 firewalled resource to be used by Level 2. Similarly, Level 2 management software can establish the Level 2 firewalled resource to be used by Level 3. The Level 3 OS or hypervisor cannot force a Level 2 or Level 1 resource to be shared with it. Also, the ASIL-D hypervisor or TEE OS in Level 2 cannot force Level 1 to share a resource with it.

Figure 3:
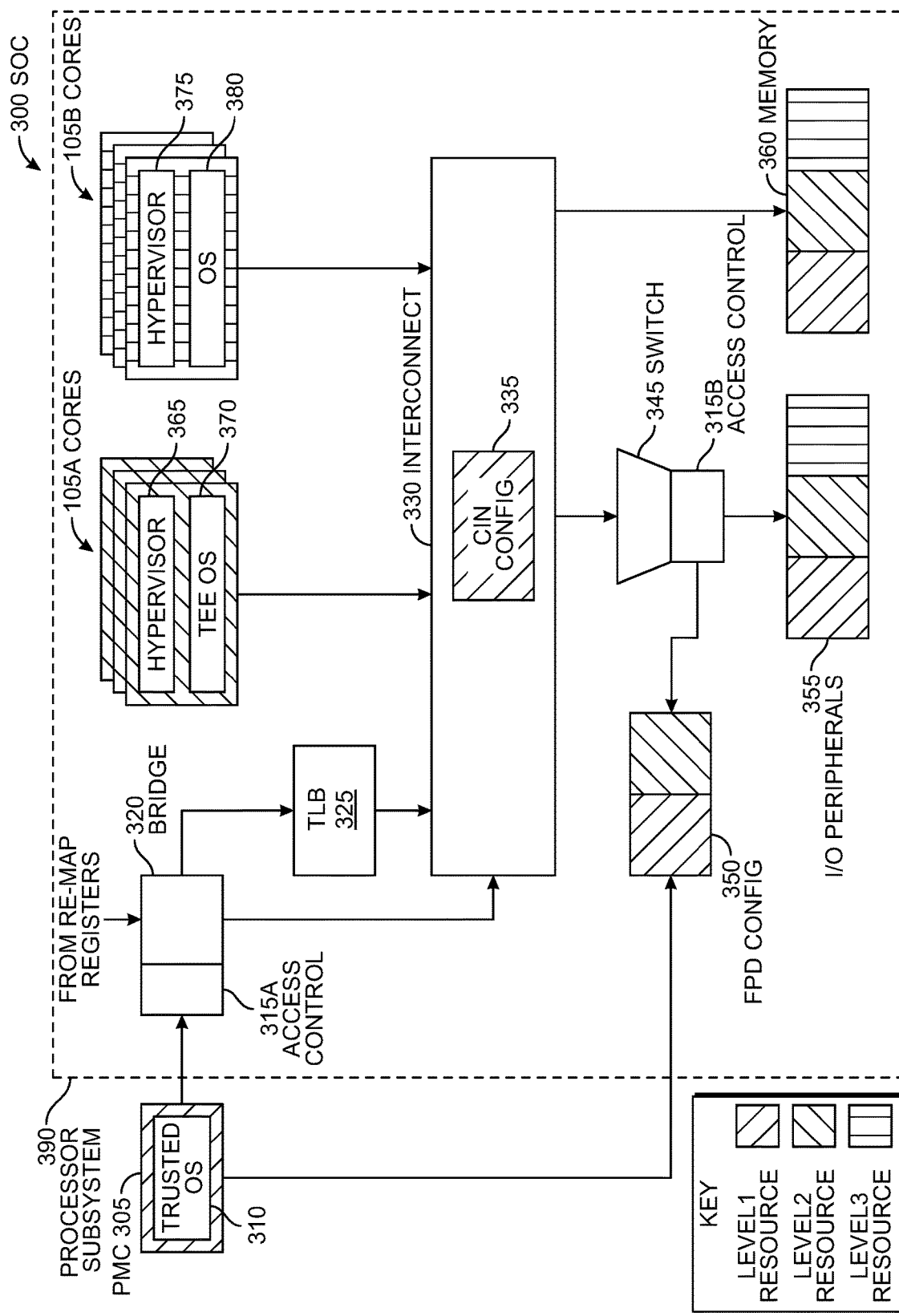
FIG. 3 is a block diagram of a system on a chip that is partitioned into a hierarchy, according to an example.

FIG. 3 is a block diagram of a SoC 300 that is partitioned into a hierarchy, according to an example. The SoC 300 includes a processor subsystem 390, a PMC 305, and I/O peripherals 355. The PMC 305 is tasked with executing a trusted OS 310 (e.g., Level 1 management software) that serves as the management software for Level 1 of the hierarchy. The PMC 305 can be a dedicated, hardened processor, or can be a soft processor implemented in programmable logic (e.g., a programmable fabric) in the SoC 300. However, in another embodiment, rather than executing the trusted OS 310 using hardware resources outside of the processor subsystem 390, the OS 310 may be executed using resources in the subsystem 390 (e.g., one of the processor cores 105).

FIG. 3 includes a key that links the different hatchings to the levels in the hierarchy. If a component does not have a hatching, this indicates it is not divided into different levels and can be accessed by hardware resources in all the levels. Although not shown, the SoC 300 may also include other components such as a NoC, programmable logic, an array of data processing engines, and I/O interfaces. Some or all of these additional hardware components can be communicatively coupled to the hardware components illustrated in FIG. 3 and may (or may not) be partitioned into the levels of the hierarchy.

The processor subsystem 390 includes access control circuitry 315A, a bridge 320, I/O translation lookaside buffer (TLB) 325, an interconnect 330, the processor cores 105, a switch 345, access control circuitry 315B, full power domain configuration (FPD config) registers 350, and memory 360. The PMC 305 and the trusted OS 310 in Level 1 can communicate with the processor subsystem 390 using a pathway that permits the OS 310 to configure the interconnect 330. This pathway flows through the access control circuitry 315A, through the bridge 320, and to the interconnect 330. In one embodiment, the interconnect 330 is a coherent interconnect network (CIN). In addition to configuring the interconnect 330, the trusted OS 315 can use these pathways to configure the access control circuitry 315A and 315B to set up firewalls. These pathways are the start-of-day pathways so that the Level 1 trusted OS 310 is the first software actor to configure the processor subsystem 390. In one embodiment, the trusted OS 310 (i.e., the Level 1 management software) holds Level 2 and Level 3 management software under reset so they cannot configure the processor subsystem 390.

FIG. 3 also illustrates a control pathway from re-map registers to the bridge 320. This pathway determines whether access from the PMC 305 uses the direct pathway between the bridge 320 and the interconnect 330 (e.g., an Advanced Peripheral Bus (APB) pathway) or the indirect pathway that flows through the TLB 325 to reach the interconnect 330 (e.g., AXI4-MM pathway). In one embodiment, the trusted OS 310 and any other Level 1 management software are the only software actors with access to the control register that determines the control signals sent on the control pathway to the bridge 320 from the re-map registers.

In one embodiment, the APB pathway between the bridge 320 and the interconnect 330 or the AXI4-MM pathway between the TLB 325 and the interconnect can be used to access CIN configuration (CIN config) registers 335 in the interconnect 330. The trusted OS 310 can use either of these pathways to set a register 335 that is only reachable via the APB or AXI4-MM pathways such that no Level 2 or Level 3 management software can configure any of the CIN config registers 335 once the Level 2 or Level 3 management software is in an operational mode. Thus, the trusted OS 310 can block Level 2 and 3 resources from accessing the CIN config registers 335.

By ensuring only the Level 1 management software (e.g., the trusted OS 310) can access the CIN config registers 335, the trusted OS 310 can then lock access to the configuration pathways to the CIN config registers 335 such that Level 1 only resources such as the PMC 305 can access these registers 335. More importantly, a CIN configuration of the interconnect 330 can be firewalled such that Core-to-CIN-configuration registers cannot change the base-level configuration, including the configuration that sets up the address routing attributes for Level 2 or Level 3 cores 105 to access memory 360, peripherals 355, or accelerator resources (not shown in FIG. 3). Thus, the example CIN firewalling for the interconnect 330 to achieve the mixed-criticality configuration of FPD cannot be overridden even by Level 2 cores 105A (e.g., lockstep safety critical cores).

The Level 1 trusted OS 310 in the PMC 305 can configure the access control circuitry 315A and 315B (e.g., memory protection units) such that Level 2 or Level 3 software accessing the cores 105 are firewalled from accessing any of the CIN config registers 335. Additionally, the trusted OS 310 can also configure the access control circuitry 315A and 315B (e.g., memory protection units) such that full power domain (FPD) config registers 350 accessed via the switch 345 and the interconnect 330 are only available to Level 1 and Level 2 management software. That is, the FPD config registers 350 have two hatchings to indicate some of the registers are assigned to Level 1 while other registers are assigned to Level 2. The Level 1 FDP config registers 350 are accessible by a pathway from the PMC 305 to the registers 350 while the Level 2 FOP config registers 350 are accessible to a hypervisor 365 or TEE OS 370 on the Level 2 designated cores 105A via the interconnect 330 and the switch 345.

The trusted OS 310 can also configure the access control circuitry 315B such that certain I/O peripherals 355 are only accessible to Level 1 management software, Level 2 management software, or Level 3 management software. That is, the I/O peripherals 355 have three hatchings to indicate some of the peripherals 355 are assigned to Level 1, some are assigned to Level 2, and some are assigned to Level 3. The access control circuitry 315B can ensure that Level 3 resources (e.g., a hypervisor 375 and OS 380 in the Level 3 designated cores 105B) can only access Level 3 peripherals 355 and that Level 2 resources (e.g., a hypervisor 365 and TEE OS 370 in the Level 2 designated cores 105A) can only access Level 2 or Level 3 peripherals 355. Level 1 resources, such as the trusted OS 310, can manage Level 1, Level 2, and Level 3 peripherals 355.

The Level 1 trusted OS 310 can configure the interconnect 330 using the CIN config registers 335 so only certain portions of the memory 360 are accessible to Level 1 resources, to Level 2 resources, and to Level 3 resources. The memory 360 includes three hatchings to indicate some of the memory 360 is assigned to Level 1, some is assigned to Level 2, and some is assigned to Level 3. The interconnect 330 can provide the same access control described above where Level 3 resources can access only the portion of the memory 360 assigned to Level 3. Level 2 resources may be able to access and manage the portions of the memory 360 assigned to Level 2 and Level 3, but not the portion of memory 360 assigned to Level 1. Level 1 resources can access and manage all the memory 360.

Although not illustrated, a common memory pathway can exist to access the memory 360 with the access control circuitry 315E configured by the trusted OS 310 to ensure only Level 1, Level 2, and Level 3 resources can access their respective portions of the memory 360. Similarly, the SoC 300 can include dedicated I/O peripheral pathways in the interconnect 330, where the trusted OS 310 configures the interconnect 330 such that Level 1, Level 2, and Level 3 resources can only access their respective Home I/O gateway pathways in the interconnect 330 to access their respective I/O Peripherals 355.

In one embodiment, the memory 360 can include different types of memory such as OCM, DDR, and accelerator memory which may be contained within an accelerator engine (not shown) in the processor subsystem 390.

Once the Level 1 management software (e.g., the trusted OS 310) has set up the system as shown in FIG. 3, it can then release the cores 105 out of reset such that the Level 2 cores 105A, which can have either one of a ASIL-D hypervisor 365 or a TEE OS 370 pinned to them, is firewalled from accessing Level 1 resources such as the CIN config registers 335, Level 1 FPD config registers 350, Level 1 I/O peripherals 355, and Level 1 memory 360. However, the Level 2 cores and the hypervisor 365 and/or the TEE OS 370 can manage, configure, or reconfigure Level 2 resources such as Level 2 FPD config registers 350, Levels 2 and 3 peripherals 355, and Levels 2 and 3 memory 360. Further, the hypervisor 365 and the TEE OS 370 (e.g., Level 2 management software) can perform Level 2 services for, and communicate with, the Level 3 hypervisor 375 and OS 380 (e.g., Level 3 management software). In one embodiment, the Level 3 hypervisor 375 can be an ASIL-C/B hypervisor while the Level 3 OS 380 can be a non-TEE OS. This management software can only access the Level 3 resources such as the Level 3 peripherals 355 and memory 360.

While FIG. 3 illustrates the Level 2 cores 105A having both the hypervisor 365 and the TEE OS 370 and the Level 3 cores 105B having both the hypervisor 375 and the OS 380, the SoC 300 may include one type of management software, per Level, depending on the application. For example, if the SoC 300 is used in a safety critical application, an ASIL-D hypervisor 365 is pinned to the cores 105A while an ASIL-C/B hypervisor is executed by the cores 105B. Instead, if the SoC 300 is used in a security critical application, a TEE OS 370 is pinned to the cores 105A and a non-TEE OS 380 executes on the cores 105B.

FIG. 3 illustrates a Level 1-through-3 hierarchical approach to both the hardware and software configuration. FIG. 3 illustrates the hierarchical approach executed in a time sequence, where the software for configuration of the Level 1 hierarchy is executed first, followed by the software execution for configuration of the Level 2 (and Level 3) hierarchy. But FIG. 3 also illustrates the hierarchical approach in space, where Level 1, Level 2, and Level 3 software only has access to their respective physical Memory and I/O peripheral resources. This two-prong approach deviates from other techniques where the hypervisor manages all resources in the processor subsystem, and also deviates from techniques where the hypervisor or secure execution privilege level can be invoked by all cores that have the capability to execute the hypervisor or secure execution privilege level, which is typically the case with the multi-core system being built with multiple instances of the same core type. Put differently, here, only certain cores 105A can execute the safety critical hypervisor 365 and the TEE OS 370.

A greater level of functional safety, debug, and security can be achieved by having a base Level 1 with its own private resources, and delegating ASIL-D/Hypervisor or TEE OS to Level 2, unable to access any Level 1 resources. Meanwhile, the Level 2 ASIL-D/Hypervisor or TEE OS is pinned to the Level 2 cores only, with dedicated physical or logical pathways to Level 2 memory 360 and peripheral 355. Thus, even if the Level 3 cores 105B are capable of running software at a hypervisor or secure execution privilege level, pinning the Level 2 software to the Level 2 cores 105A prevents the Level 3 cores 105E from ever invoking the hypervisor or secure execution privilege level and thus improving security and/or safety. Improved security and/or safety may also be offered on the Level 2 assigned hardware through additional dedicated firewall or reliability attributes along the physical or logical pathways to Level 2 memory 360 and peripherals 355.

Figure 4:
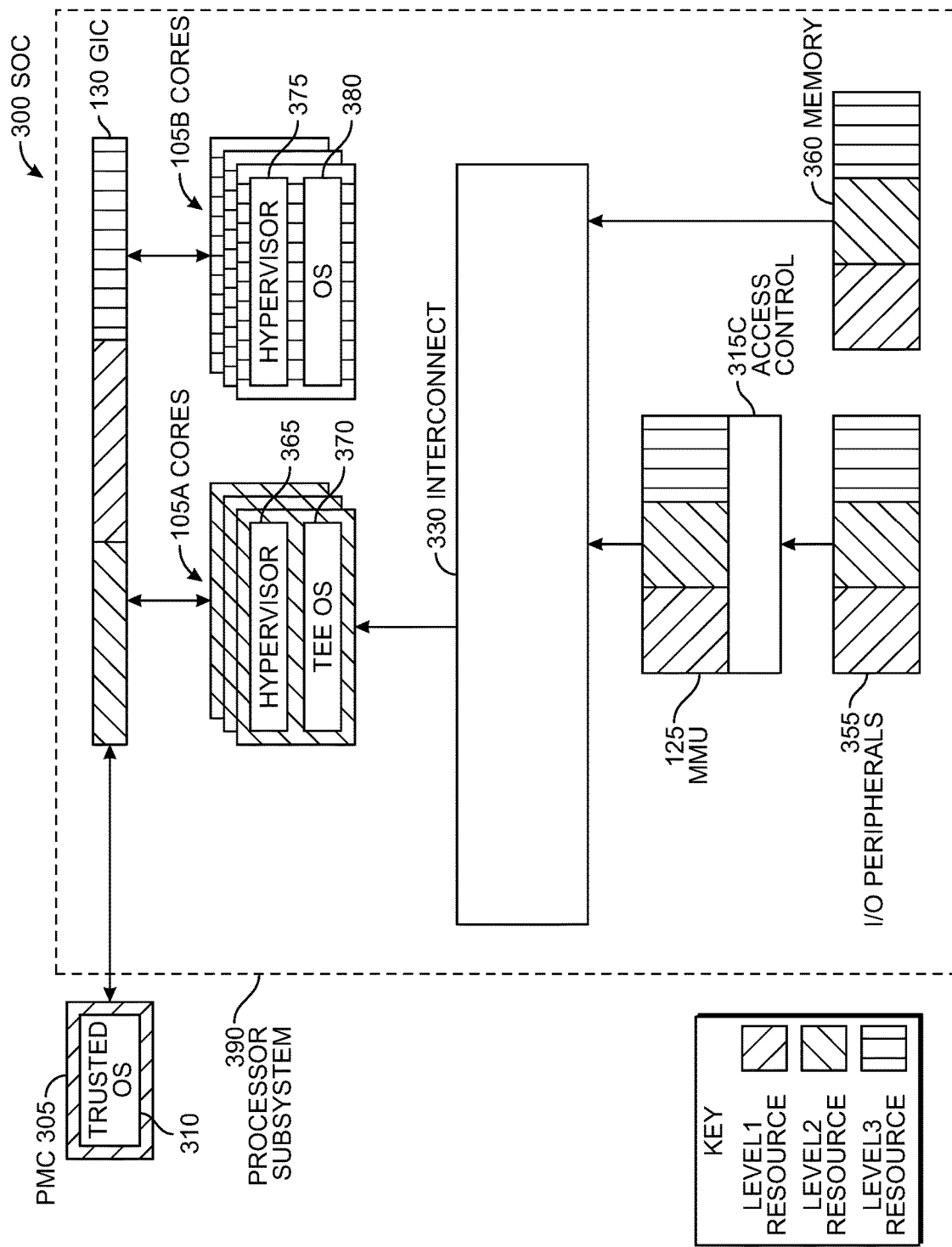
FIG. 4 is a system on a chip that is partitioned into a hierarchy, according to an example.

FIG. 4 illustrates the SoC 300, according to an example. While FIG. 3 illustrates the flow of data in the SoC 300 from the cores 105 to the I/O peripherals 355 and memory 360, FIG. 4 illustrates the flow of data in the SoC 300 from the I/O peripherals 355 and memory 360 to the cores 105.

Like FIG. 3, FIG. 4 also includes the cores 105, the PMC 305, the interconnect 330, the I/O peripherals 355, and the memory 360. However, FIG. 4 also illustrates a GIC 130 which is used to send interrupts to the PMC 305 and the cores 105, and the MMU 125 which forwards data from the peripherals 355 to the cores 105 via the interconnect. Access to the MMU 125 is controlled by access control circuitry 315C which can be configured by the trusted OS 310 while the hypervisor 365, TEE OS 370, hypervisor 375, and OS 380 are in reset states. The access control circuitry 315C can ensure that resources on lower levels cannot access portions of the MMU 125 assigned to higher levels.

Both the GIC 130 and the MMU 125 are partitioned and assigned to different levels in the hierarchy. That is, like the I/O peripherals 355 and the memory 360, portions of the GIC 130 and the MMU 125 are assigned to Levels 1, 2, and 3. The SoC 300 can include firewalls so that data from Level 3 resources (e.g., the Level 3 peripherals 355) cannot access portions of the MMU 125 assigned to Level 2 or Level 3. Similarly, the firewalls can ensure that the Level 2 peripherals 355 cannot access the portion of the MMU 125 assigned to Level 1.

Figure 5:
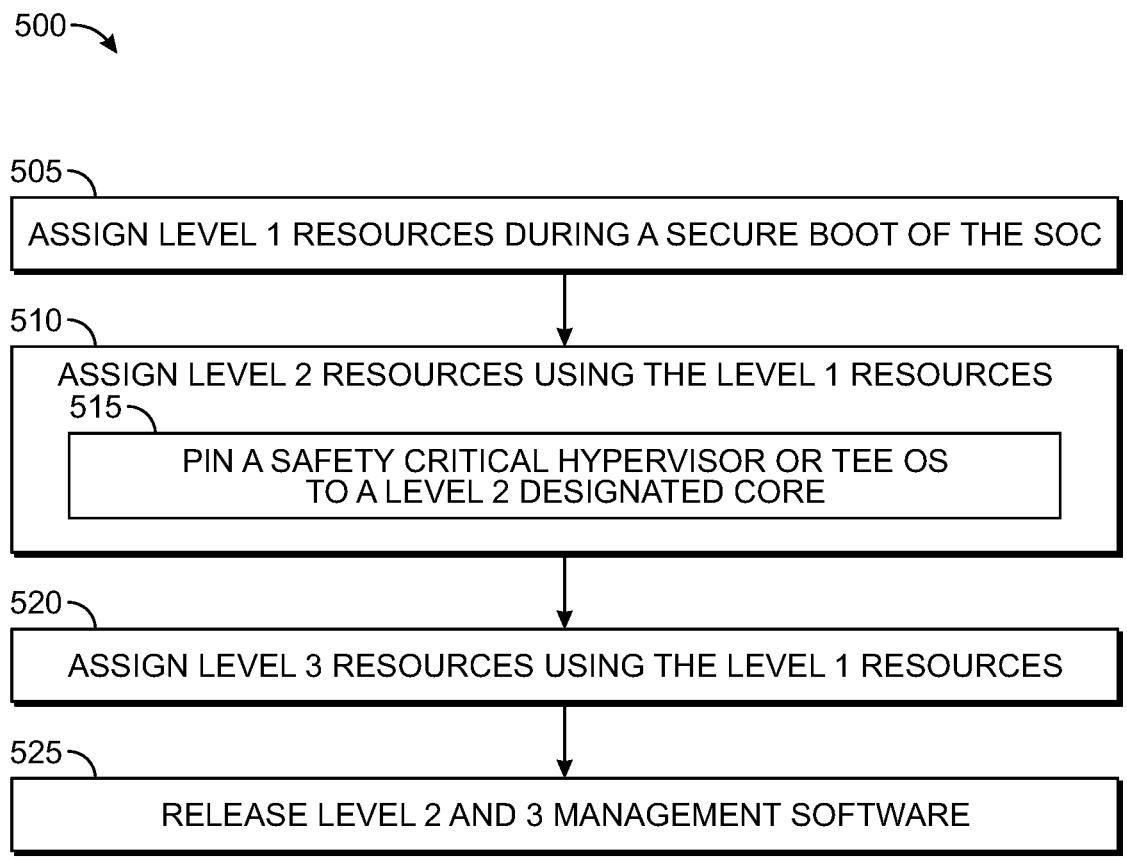
FIG. 5 is a flowchart for partitioning resources in a system on a chip to form a hierarchy, according to an example.

FIG. 5 is a flowchart of a method 500 for partitioning resources in a system on a chip to form a hierarchy, according to an example. At block 505, the SoC assigns Level 1 resources during a secure boot. In one embodiment, Level 1 is the highest level (e.g., the most trusted or safest level) that is controlled by a secure boot loaded root of trust configuration.

In one embodiment, the secure boot loads a trusted OS (e.g., the trusted OS 310 in FIG. 3A) which then assigns the Level 1 resources. During this time, the Level 2 and Level 3 management software (e.g., hypervisors and OSs) are held in a reset state. Further, the trusted OS may execute on a hardware device (e.g., a PMC or a dedicated core) that is internal to the processor subsystem, or is external of the processor subsystem.

In one embodiment, the Level 1 trusted OS configures the interconnect (e.g., a cache coherent interconnect) that couples the processor cores to other components in the processor subsystem. The OS can also set up firewalls using the access control circuitry.

In one embodiment, the Level 1 trusted OS configures the CIN config registers in the interconnect. Further, these registers may be accessible to only Level 1 resources. Thus, when the Level 2 and Level 3 management software is released from reset, they cannot configure the CIN config registers.

In one embodiment, the Level 1 trusted OS configures FPD configuration space using the FPD config registers 350 in FIG. 3. In one example, the trusted OS configures the access control circuitry such that some of the FPD config registers are assigned to Level 1.

At block 510, the Level 1 management software (e.g., the trusted OS) assigns Level 2 resources. In one embodiment, the Level 1 trusted OS configures FPD configuration space to also include Level 2 FPD config registers in addition to the Level 1 FPG config registers created in block 505. In one example, the trusted OS configures the access control circuitry such that some of the FPD config registers are assigned to Level 2 resources.

In one embodiment, the trusted OS uses the access control circuitry in FIGS. 3 and 4 so that certain I/O peripherals 355, portions of the memory 360, and portions of the MMU 125 are assigned to Level 2, and thus, are accessible to Level 2 resources such as a hypervisor or OS.

Block 510 includes an optional sub-block 515 where the Level 1 OS pins a safety critical hypervisor or TEE OS to a Level 2 designated processor core. That is, the Level 1 resources choose a hardware resource (e.g., one of the processor cores in the processor subsystem) that executes the management software for Level 2. By pinning the safety critical hypervisor or TEE OS to particular core or cores, this prevents this software from migrating to a different core which may be not operated according to a particular safety or security standard (e.g., a non-lockstep core). Thus, even if Level 3 cores are capable of running software at a hypervisor or secure execution privilege level, pinning the Level 2 management software to the Level 2 cores prevents Level 3 cores from ever invoking the hypervisor or secure execution privilege level and thus preventing compromising security and/or safety. In addition to pinning the safety critical software or TEE OS to a Level 2 core, the safety critical hypervisor or TEE OS can have dedicated physical or logical pathways to the Level 2 I/O peripherals and memory.

At block 520, the Level 1 trusted OS assigns the Level 3 resources. In one embodiment, the trusted OS uses the access control circuitry in FIGS. 3 and 4 so that certain I/O peripherals 355, portions of the memory 360, and portions of the MMU 125 are assigned to Level 3, and thus, are accessible to Level 3 resources such as a hypervisor or OS.

The method 500 illustrates blocks 510 and 520 as sequential steps, the trusted OS may create the Level 2 and 3 resources at the same time. For example, at the same time the trusted OS configures access control circuitry to assign I/O peripherals 355, portions of the memory 360, and portions of the MMU 125 to Level 2, the trusted OS can also configure the access control circuitry to assign I/O peripherals 355, portions of the memory 360, and portions of the MMU 125 to Level 3.

Further, although not shown in the method 500, the Level 2 management software can also help create the Level 3 resources. That is, the Level 2 hypervisor or OS may determine how much memory, or how many I/O peripherals, are assigned for use by the Level 3 hypervisor or OS. For example, a Level 2 hypervisor, ASIL-D OS or TEE OS can assign Level 3 resources, but within the bounds that those Level 2 assignments are firewalled from Level 1 resources (which were set up by Level 1 management software).

At block 525, the trusted OS releases the Level 2 and Level 3 management software. That is, once the Level 2 and Level 3 resources are created, the Level 2 and Level 3 hypervisors or OSs can then be released and begin using those assigned resources to perform their corresponding functions. In one embodiment, the Level 1 management software may release the Level 2 and Level 3 hypervisors or OSs. In another embodiment, the Level 1 management source releases the Level 2 hypervisors or OSs while the Level 2 hypervisors or OSs release the Level 3 hypervisors or OSs.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system on a chip (SoC), comprising:
   a first hardware processing element to execute a trusted operating system (OS) that is assigned to a first level in a hierarchy;
   a second hardware processing element to execute a first hypervisor or OS that is assigned to a second level in the hierarchy;
   a third hardware processing element to execute a second hypervisor or OS that is assigned to a third level in the hierarchy, wherein the first, second, and third hardware processing elements are different from each other;
   memory where a first portion of the memory is assigned to the first level, a second portion of the memory is assigned to the second level, and a third portion of the memory is assigned to the third level, wherein the trusted OS is authorized to manage the first, second, and third portions of the memory, the first hypervisor or OS is authorized to manage the second and third portions of the memory but not the first portion of the memory, and the second hypervisor or OS is authorized to manage only the third portion of the memory; and
   an interconnect that communicatively couples the respective hardware processing elements to the memory and prevents resources of the second and third hardware processing elements from accessing registers of the interconnect configured by resources of the first hardware processing element.

2. The SoC of claim 1, wherein the first hypervisor or OS is pinned to the second hardware processing element by the trusted OS such that the first hypervisor or OS cannot be executed on the third hardware processing element and is executed only by the second hardware processing element, wherein the first hypervisor or OS is one of: a safety critical hypervisor or an OS in a Trusted Execution Environment (TEE).

3. The SoC of claim 2, wherein the second hardware processing element is executed in lockstep with a fourth hardware processing element in the second level.

4. The SoC of claim 2, wherein the first hypervisor or OS is an Automotive Safety Integrity Level (ASIL)-D hypervisor and the second hypervisor or OS is at least one of an ASIL-B, ASIL-C, or untrusted hypervisor.

5. The SoC of claim 2, wherein the first hypervisor or OS is a security critical OS in the TEE and the second hypervisor or OS is a non-security critical OS that is not in the TEE.

6. The SoC of claim 1, further comprising:
   I/O peripherals where a first portion of the I/O peripherals is assigned to the first level, a second portion of the I/O peripherals is assigned to the second level, and a third portion of the I/O peripherals is assigned to the third level, wherein the trusted OS is authorized to manage the first, second, and third portions of the I/O peripherals, the first hypervisor or OS is authorized to manage the second and third portions of the I/O peripherals but not the first portion of the I/O peripherals, and the second hypervisor or OS is authorized to manage only the third portion of the I/O peripherals.

7. The SoC of claim 1, wherein the first hardware processing element is a first processor core, the second hardware processing element is a second processor core, and the third hardware processing element is a third processor core.

8. The SoC of claim 7, wherein the interconnect forms a coherent interconnect network (CIN) in a processor subsystem, and wherein the registers of the interconnect are managed only by resources in the first level of the hierarchy.

9. The SoC of claim 8, further comprising:
   full power domain (FPD) configuration registers in the processor subsystem, wherein a first portion of the FPD configuration registers are assigned to the first level and a second portion of the FPD configuration registers are assigned to the second level, and wherein none of the FPD configuration registers are accessible to resources in the third level.

10. The SoC of claim 1, further comprising:
    a Level 2 firewalled resource that is assigned to the second Level but is accessible by resources in both the second and third levels.

11. The SoC of claim 1, further comprising:
a memory management unit (MMU) to permit I/O peripherals to transmit data to the first, second, and third hardware processing elements, wherein a first portion of the MMU is assigned to the first level, a second portion of the MMU is assigned to the second level, and a third portion of the MMU is assigned to the third level, wherein the trusted OS is authorized to manage the first, second, and third portions of the MMU, the first hypervisor or OS is authorized to manage the second and third portions of the MMU but not the first portion of the MMU, and the second hypervisor or OS is authorized to manage only the third portion of the MMU; and
a general interrupt controller (GIC) to send interrupts to the first, second, and third hardware processing elements, wherein a first portion of the GIC is assigned to the first level, a second portion of the GIC is assigned to the second level, and a third portion of the GIC is assigned to the third level, wherein the trusted OS is authorized to manage the first, second, and third portions of the GIC, the first hypervisor or OS is authorized to manage the second and third portions of the GIC but not the first portion of the GIC, and the second hypervisor or OS is authorized to manage only the third portion of the GIC.

12. A SoC, comprising:
a first hardware processing element to execute a trusted operating system (OS) that is assigned to a first level in a hierarchy; and
a processor subsystem comprising:
a first processor core to execute one of a safety critical hypervisor or a TEE OS, wherein the first processor core is assigned to a second level in the hierarchy;
a second processor core to execute one of a non-safety critical hypervisor or second OS that is not in a TEE, wherein the second processor core is assigned to a third level in the hierarchy, wherein the first processor core is different from the second processor core; and
an interconnect that prevents resources of the second processor core from accessing registers of the interconnect configured by resources of the first processor core,
wherein the trusted OS is authorized to manage hardware resources assigned to the first, second and third levels, the safety critical hypervisor or the TEE OS is authorized to manage hardware resources assigned to the second and third levels but not the first level, and the non-safety critical hypervisor or second OS is authorized to manage hardware resources assigned to the third level but not the first and second levels.

13. The SoC of claim 12, wherein the safety critical hypervisor or the TEE OS is pinned to the first processor core by the trusted OS such that the safety critical hypervisor or the TEE OS cannot be executed on the second processor core and is executed only by the first processor core.

14. The SoC of claim 12, wherein the first processor core is executed in lockstep with a third processor core in the processor subsystem, wherein the third processor core is assigned to the second level.

15. The SoC of claim 12, wherein the first hardware processing element comprises programmable logic, wherein the programmable logic is loads and executes the trusted OS as part of a secure boot when the SoC is being powered on, wherein the programmable logic is external to the processor subsystem.

16. A method, comprising:
assigning Level 1 resources in a SoC during a secure boot of the SoC;
assigning Level 2 resources in the SoC using a Level 1 trusted OS that was loaded during the secure boot, wherein the Level 2 resources comprises a first hypervisor or OS that is held in reset while assigning the Level 2 resources;
assigning Level 3 resources in the SoC using the Level 1 trusted OS, wherein the Level 3 resources comprises a second hypervisor or OS that is held in reset while assigning the Level 3 resources, wherein the Level 1 trusted OS is authorized to manage the Level 1, 2, and 3 resources, the Level 2 resources are authorized to manage the Level 2 and 3 resources but not the Level 1 resources, and the Level 3 resources are authorized to manage the Level 3 resources but not the Level 1 and 2 resources; and
releasing the first hypervisor or OS and the second hypervisor or OS from reset while preventing the Level 2 resources and the Level 3 resources from accessing coherent interconnect network (CIN) registers configured by the Level 1 resources.

17. The method of claim 16, wherein the first hypervisor or OS is pinned to a first processor core assigned to the Level 2 resources by the trusted OS such that the first hypervisor or OS cannot migrate to any processor core assigned to the Level 3 resources, wherein the first hypervisor or OS is one of: a safety critical hypervisor or a TEE OS.

18. The method of claim 17, further comprising, after releasing the first hypervisor or OS:
operating the first processor core in lockstep with a second processor core also assigned to the Level 2 resources, wherein the first processor core is different than the second processor core.

19. The method of claim 17, wherein at least one of: (i) the first hypervisor or OS is an ASIL-D hypervisor and the second hypervisor or OS is at least one of an ASIL-B, ASIL-C, or untrusted hypervisor or (ii) the first hypervisor or OS is a security critical OS in a trusted execution environment (TEE) and the second hypervisor or OS is a non-security critical OS that is not in the TEE.

20. The method of claim of claim 16, wherein assigning the Level 1, 2, and 3 resources in the SoC further comprises:
assigning a first portion of memory to the Level 1 resources;
assigning a second portion of the memory to the Level 2 resources; and
assigning a third portion of the memory to the Level 3 resources, wherein the trusted OS is authorized to manage the first, second, and third portions of the memory, the first hypervisor or OS is authorized to manage the second and third portions of the memory but not the first portion of the memory, and the second hypervisor or OS is authorized to manage only the third portion of the memory.

* * * * *